US012081354B2

(12) United States Patent
Yu

(10) Patent No.: US 12,081,354 B2
(45) Date of Patent: Sep. 3, 2024

(54) AUDIO CAPTURE DEVICE SELECTION

(71) Applicant: Zoom Video Communications, Inc., San Jose, CA (US)

(72) Inventor: Chi-chian Yu, San Ramon, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 18/297,778

(22) Filed: Apr. 10, 2023

(65) Prior Publication Data
US 2023/0246865 A1 Aug. 3, 2023

Related U.S. Application Data

(63) Continuation of application No. 17/588,771, filed on Jan. 31, 2022, now Pat. No. 11,652,655.

(51) Int. Cl.
| | | |
|---|---|---|
| *H04L 12/18* | (2006.01) | |
| *G06F 21/44* | (2013.01) | |
| *G10L 15/08* | (2006.01) | |
| *G10L 25/60* | (2013.01) | |
| *H04W 4/02* | (2018.01) | |

(52) U.S. Cl.
CPC ......... *H04L 12/1822* (2013.01); *G06F 21/44* (2013.01); *G10L 15/08* (2013.01); *G10L 25/60* (2013.01); *H04W 4/025* (2013.01); *G10L 2015/088* (2013.01)

(58) Field of Classification Search
CPC ..... H04L 12/1822; G06F 21/44; G10L 15/08; G10L 25/60; G10L 2015/088; H04W 4/025
See application file for complete search history.

(56) References Cited

U.S. PATENT DOCUMENTS

| | | | |
|---|---|---|---|
| 9,049,272 B2 | 6/2015 | Salesky et al. | |
| 9,860,709 B2 | 1/2018 | Addepalli et al. | |
| 10,225,814 B2 | 3/2019 | Atti et al. | |
| 2005/0002535 A1 | 1/2005 | Liu et al. | |
| 2013/0085755 A1* | 4/2013 | Bringert | G10L 21/10 704/235 |
| 2015/0049885 A1* | 2/2015 | Oestlund | H04R 27/00 381/123 |

(Continued)

FOREIGN PATENT DOCUMENTS

| | | |
|---|---|---|
| TW | 201640878 A | 11/2016 |
| WO | 2007061584 A1 | 5/2007 |

*Primary Examiner* — Jonathan A Bui
(74) *Attorney, Agent, or Firm* — Young Basile Hanlon & MacFarlane, P.C.

(57) ABSTRACT

A microphone of a primary client device is used to capture audio for a remote conference participant. During the conference, audio is sampled from the microphone of the primary client device and from microphones of one or more secondary client devices at the same location as the primary client device. Based on a score calculated for the audio sampled from the secondary client device being higher than a score calculated for audio sampled from the primary client device, the microphone of the secondary client device is selected for audio capture for the remote conference participant. The audio is output through conferencing software to which the primary client device is connected via a user interface tile for the conference without displaying a new user interface tile.

20 Claims, 9 Drawing Sheets

(56) References Cited

U.S. PATENT DOCUMENTS

| | | | |
|---|---|---|---|
| 2015/0172879 A1* | 6/2015 | Vaidya | H04W 4/60 |
| | | | 455/466 |
| 2016/0277242 A1 | 9/2016 | Sallam | |
| 2017/0094143 A1 | 3/2017 | Hellier et al. | |
| 2020/0099792 A1* | 3/2020 | Nguyen | H04N 7/15 |
| 2020/0125316 A1 | 4/2020 | Gruebele | |
| 2021/0104253 A1* | 4/2021 | Jolly | G10L 25/60 |
| 2023/0300293 A1* | 9/2023 | VanBlon | H04N 7/15 |
| | | | 348/14.08 |

* cited by examiner

AUDIO CAPTURE DEVICE SELECTION

CROSS-REFERENCE TO RELATED APPLICATION(S)

This application is a continuation of U.S. patent application Ser. No. 17/588,771, filed Jan. 31, 2022, the entire disclosures of which are hereby incorporated by reference.

FIELD

This disclosure relates to audio capture device selection in a conference, such as when one or more users have one or more associated client devices.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
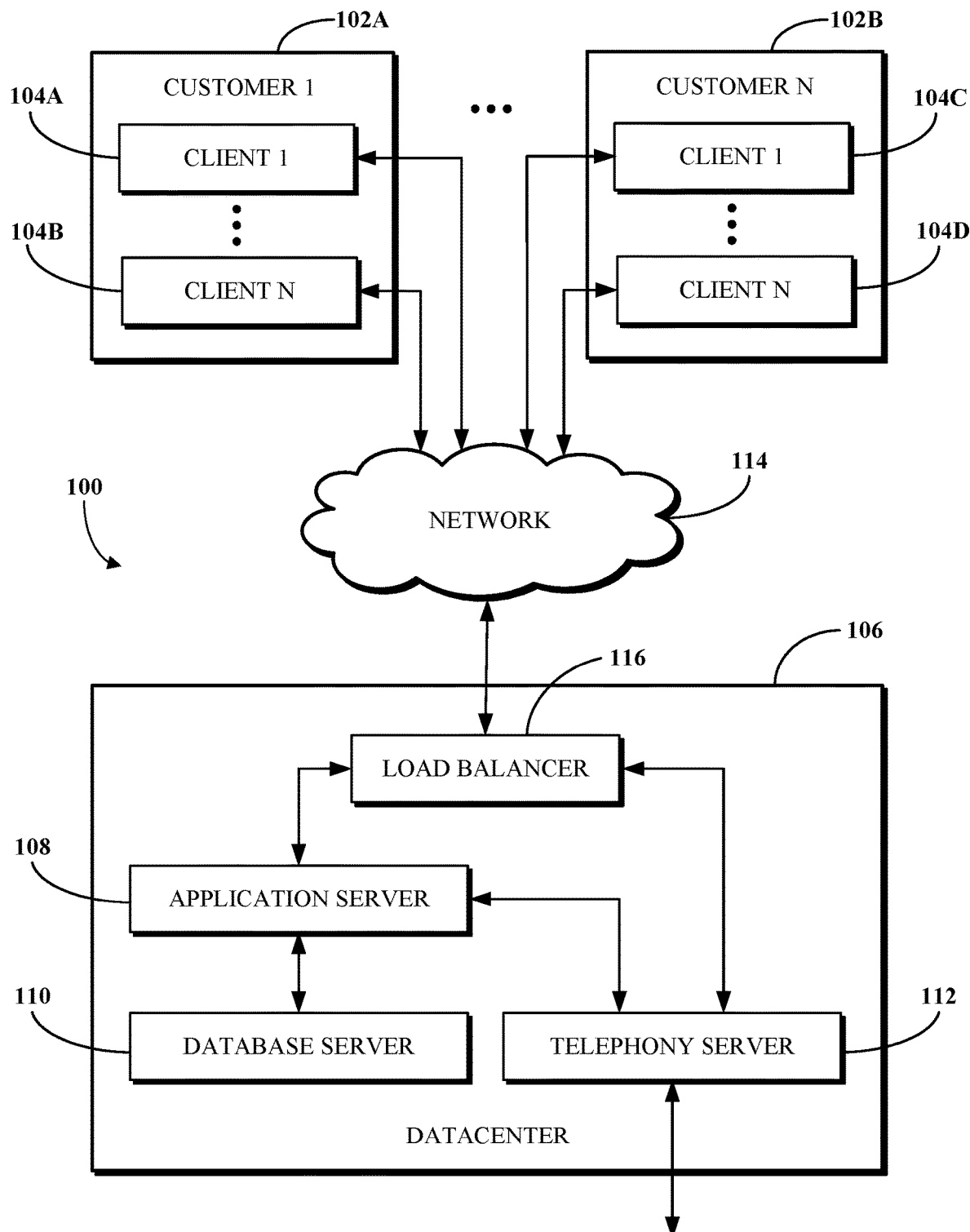
FIG. 1 is a block diagram of an example of an electronic computing and communications system.

Conferencing software, such as of a software platform (e.g., a unified communications as a service (UCaas) platform), is often used to facilitate real-time communications between user devices at different locations. The conferencing software enables user devices to join and participate in a conference in-person (e.g., from a conference room with one or more other participants) or remotely (e.g., from a location that is on-premises and not within the conference room, or from a location that is at a different geographical location than the conference room).

Typical conferencing systems enable remote user devices to connect to the conferencing software that implements a conference. The remote user device in many cases includes or otherwise uses a single audio capture device, for example, a microphone or microphone array to capture conference audio for a remote conference participant. When an audio signal captured using a microphone of a remote user device of a remote conference participant is weak or undetectable, for example due to user error (e.g., muted microphone), faulty hardware, or interference that negatively affects the audio quality thereof, it affects the overall quality of the conference. For example, a typical remote user device connected to conferencing software is unable to adequately detect poor audio quality or otherwise adjust the audio of a remote user device to improve the audio quality of the conference. In particular, software solutions available for improving audio capture, such as by adjusting gain values of the microphone or microphone array used by the remote user device, may be ineffective to improve the audio quality of the conference. While there may be, in some cases, secondary devices with their own microphones near the remote conference participant, conventional conference systems are not designed to leverage the secondary devices or their microphones to improve the audio quality of the remote conference participant.

Implementations of this disclosure address problems such as these by leveraging one or more secondary client devices associated with a remote conference participant to capture audio for output to conferencing software. Capturing audio includes receiving the audio, processing the audio, and outputting the audio to the conferencing software. The conferencing software is used to implement the conference such that video data associated with the remote user of a primary device is rendered within a UI tile of the conferencing software. The primary client device may be configured to use a microphone of a secondary client device for audio capture during the conference while video data associated with the remote conference participant of the primary client device is rendered within the UI tile of the conferencing software. In many cases, one or more of the remote conference participants may have with them a primary client device and one or more secondary client devices. The primary client device and the one or more secondary client devices may be configured to run a client application that connects to the conferencing software to allow the remote participant to participate in the conference with the local participants and other remote participants. The system, such as via the client application running at the primary client device or otherwise, determines that the secondary client device is in the possession of remote conference participant and obtains permission from the remote conference participant thereof to use the microphone of the secondary client device. The microphone of the secondary client device may thereafter be used to capture audio for the remote conference participant. The use of the microphone of the secondary client device by the primary client device in such a case refers to where the audio captured at the secondary client device is output to connected devices using the conferencing software as the audio for the conference (e.g., in connection with a UI tile of the conferencing software associated with the remote conference participant). Alternatively, the audio captured using the microphone of the secondary client device can be combined with audio captured using one or more microphones of other secondary client devices associated with the remote user to form a combined audio signal that is then output to the connected devices using the conferencing software. When the primary client device is using the microphone of the secondary client device to capture audio for the conference, the primary client device is configured to continue capturing the video component of the conference associated with the remote user for output to the conference.

To describe some implementations in greater detail, reference is first made to examples of hardware and software structures used to implement audio capture device selection for remote conference participants for improved audio quality. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over interne protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
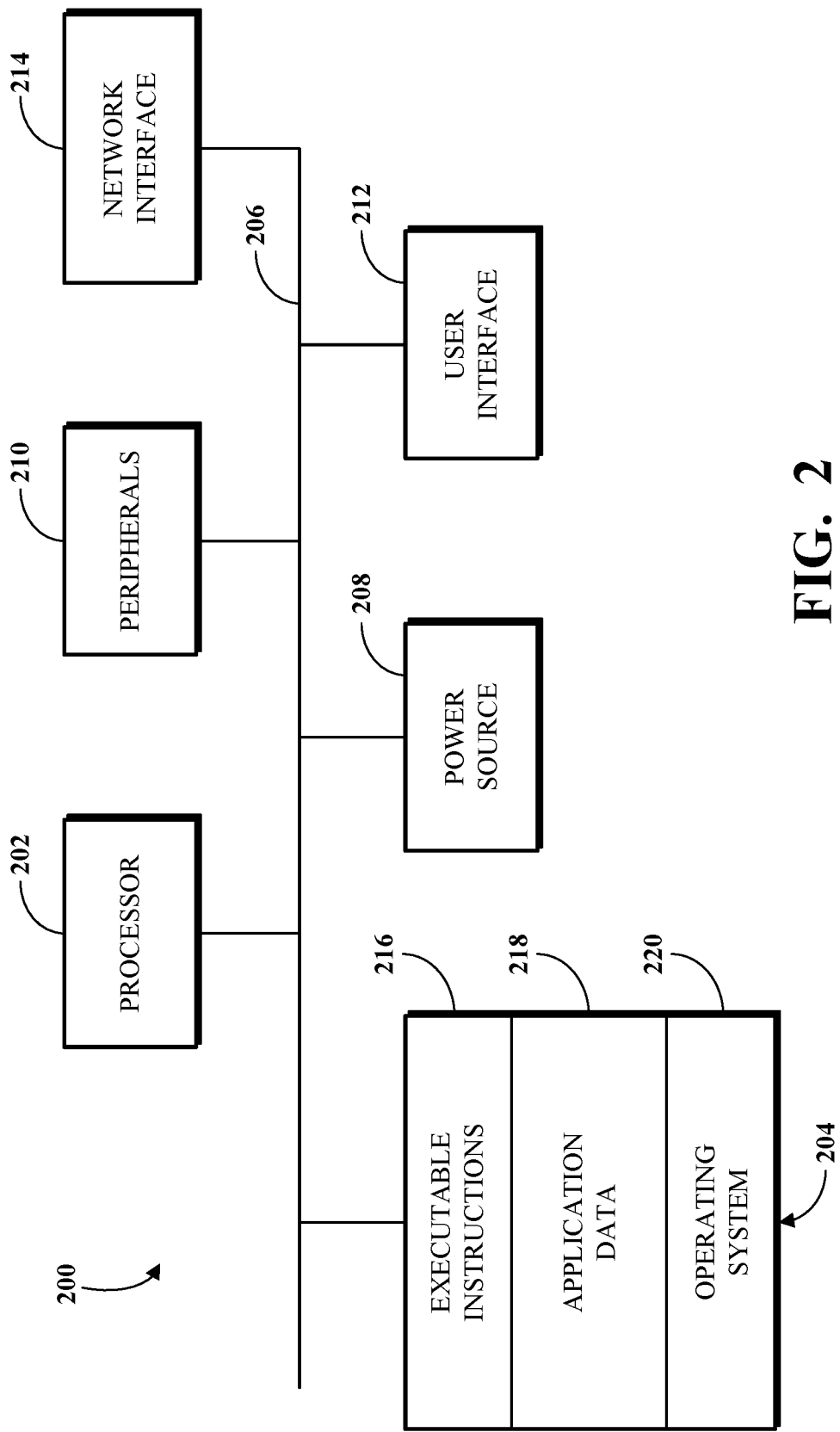
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a UI 212, a network interface 214, other suitable components, or a combination thereof. One or more of the memory 204, the power source 208, the peripherals 210, the UI 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®, an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The UI 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
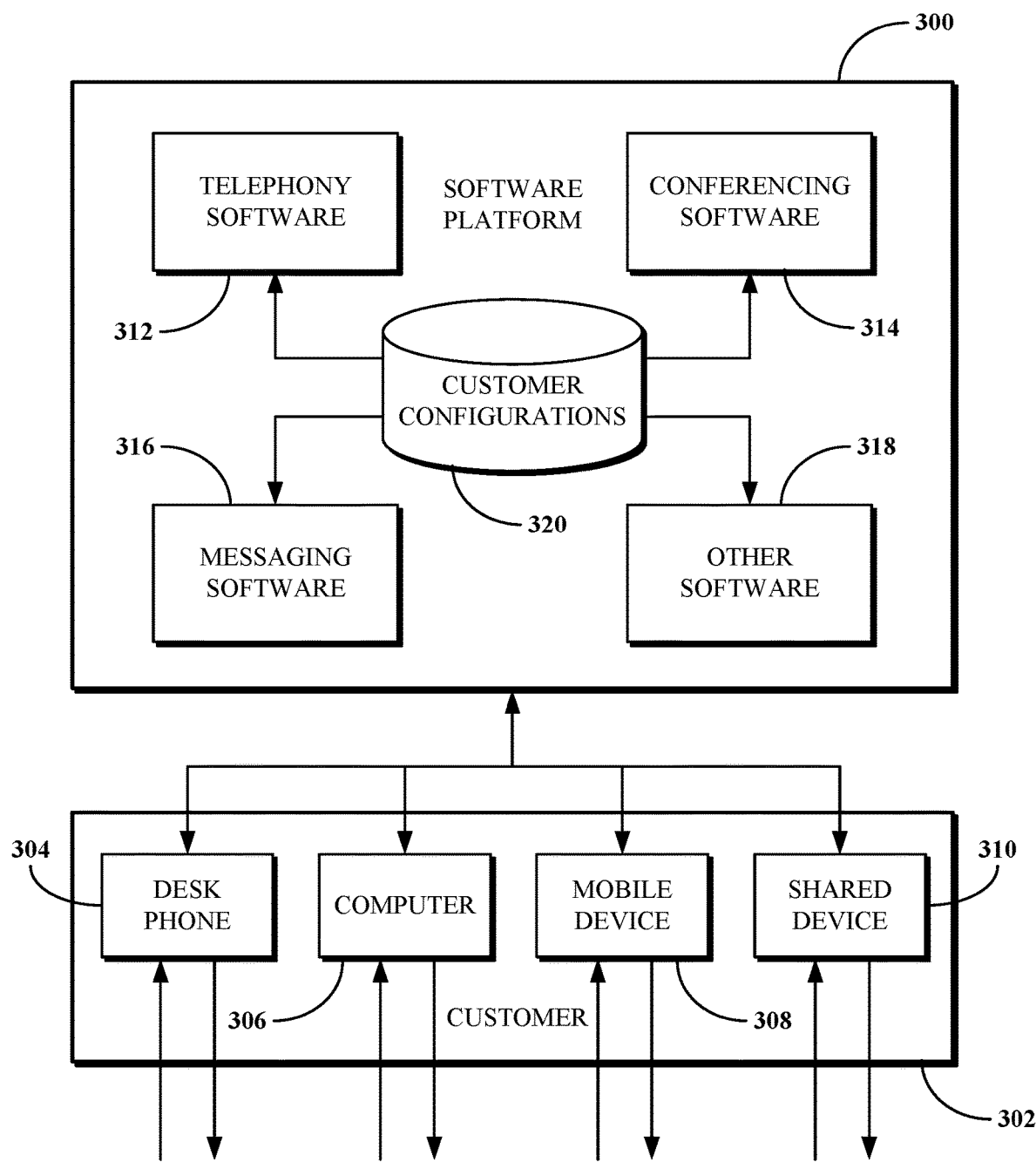
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices, televisions other than as shared devices, or automobiles and/or components thereof). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can enable audio capture device selection for remote conference participants for improved audio quality. In such a case, the other software 318 may optionally be included in the conferencing software 314.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a UI element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
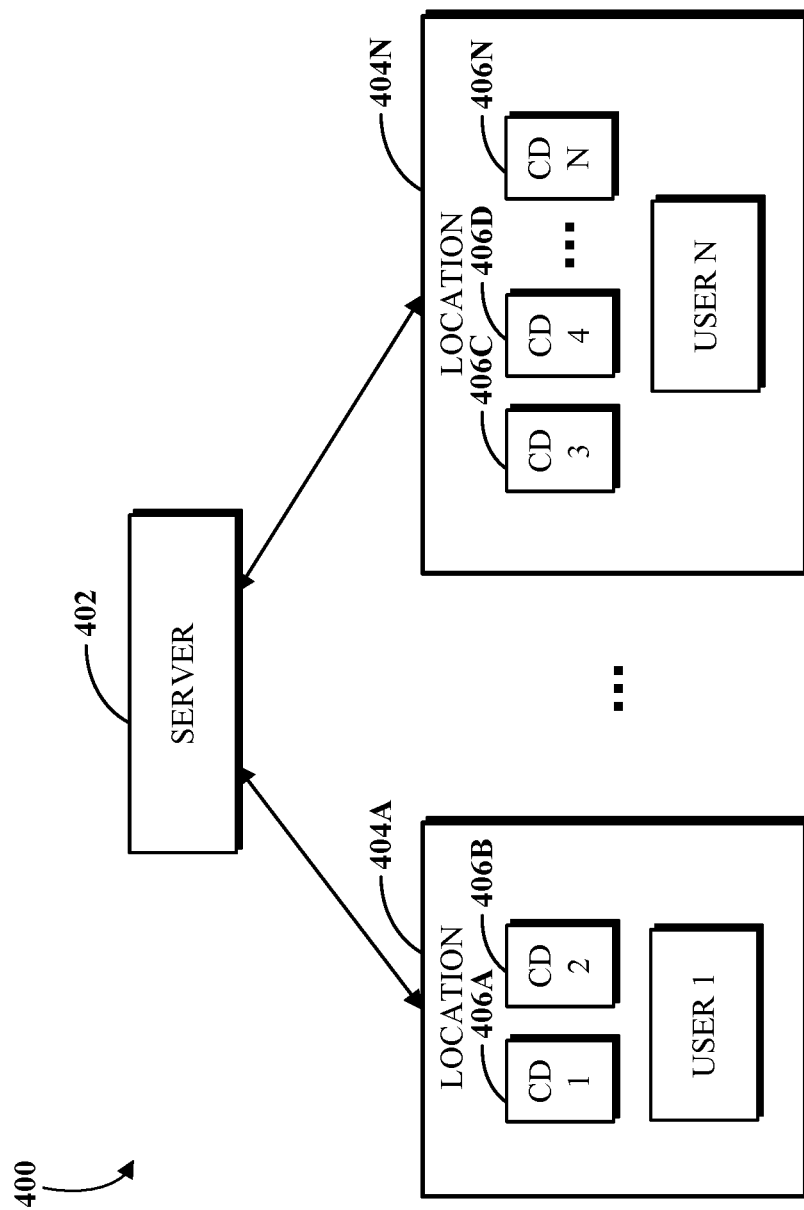
FIG. 4 is a block diagram of an example of a conferencing system.

FIG. 4 is a block diagram of an example of a conferencing system 400. The conferencing system 400 includes a server 402. The server 402 runs conferencing software, for example, the conferencing software 314 shown in FIG. 3. For example, the server 402 may be the application server 108 shown in FIG. 1. As shown, a conference implemented using the server 402 includes remote participants (e.g., User 1 through User N, in which N is an integer greater than or equal to 2) at different locations 404A through 404N connected via remote client devices 406A through 406N. The conferencing system 400 is configured to detect when an audio signal captured using a microphone of a remote client device is weak and/or negatively affected by some interference. Based on such detection, the conferencing system 400 configures one or more secondary client devices to capture audio to improve the audio quality of the conference. The conferencing system 400 is configured to output the audio captured at the secondary client device within the conferencing software running at the server 402 as the audio for the conference.

The server 402 is configured to communicate with primary client devices at the one or more locations 404A through 404N. As referred to herein, the primary client device is a device with which a conference participant, as a user of the primary client device, accesses the conference implemented using the server 402. The primary client device has a microphone or microphone array that is used to capture audio when a remote conference participant initially joins the conference. The primary client device may, for example, be one of the clients 304 through 310 shown in FIG. 3. The primary client device is configured to run a client application that connects to the conference, which is implemented using conferencing software running at the server 402 (e.g., the conferencing software 314 shown in FIG. 3), to enable the remote conference participants to participate in the conference with one or more other remote conference participants at different locations connecting on their own participant devices (e.g., remote client devices). The microphone or microphone array may be an integrated component of the primary client device. Alternatively, the microphone or microphone array may be a separate device or other component that is coupled to the primary client device using a wired or wireless connection.

As shown in FIG. 4, the location 404A contains a remote participant, User 1, and the location 404N contains another remote participant, User 2. In some examples, any of the locations 404A through 404N may be a conference room that can contain any number of participants based on the size of the conference room. As shown in FIG. 4, each remote participant may be associated with one or more client devices. In this example, User 1 may be associated with client device 1 (CD1) 406A and client device 2 (CD2) 406B, where CD1.406A is a primary client device and CD2 406B is a secondary client device. User 1 is associated with a user account, and the primary client device CD1 406A and the secondary client device CD2 406B are both associated with the same user account associated with User 1. User 2 may be associated with primary client device 3 (CD3) 406C and one or more secondary client devices CD4 406D through CDN 406N. User 2 is associated with a user account, and the primary client device CD3 406C and the secondary client devices CD4 406D through CDN 406N are all associated with the same user account associated with User 2. Associations between client devices and respective remote conference participants can be determined, for example, based on user accounts of those participants registered with the conferencing software run on the server 402 or a software platform which implements the conferencing software. For example, information stored in connection with such a user account may identify devices which have been logged into by the subject user. Where such a device is present at a location with a remote conference participant, it may be considered an associated client device.

The primary client devices CD1 406A and CD3 406C may each, for example, be a laptop computer, a desktop computer, a tablet computer, an automobile or component thereof, or a device configured to communicate with an automobile or a component thereof. The secondary client devices CD2 406B and CD4 406D through CDN 406N may each, for example, be a laptop computer, a desktop computer, a tablet computer, a voice assistant device, an automobile or component thereof, or a device configured to communicate with an automobile or a component thereof.

In an example, User 1 may be participating in a conference using the primary client device CD1 406A. At some point in time during the conference, the quality of the audio captured using a microphone of the primary client device CD1 406A may drop to an unacceptable level for the conference, for example, due to a hardware malfunction or user action. In this example, the primary client device CD1 406A or the server 402 may determine that the audio quality is below a threshold by sampling audio signals using the microphone of the primary client device CD1 406A. Sampling the audio signals includes obtaining the audio signals using a microphone to measure the quality of the audio signals. The sampled audio signals are not output to the conference. The audio quality may be determined by calculating a score, for example, a voice quality score (VQS), of the audio captured by the microphone of the primary client device CD1 406A. A VQS is a score calculated to represent the perceptible quality of a voice of the remote conference participant. The VQS may range from a score of 1.0 to 5.0 and may be based on a mean opinion score (MOS) of the audio captured by the microphone of the primary client device CD1 406A, where a score of 1.0 represents a scenario where the audio quality makes it impossible to communicate and a score of 5.0 represents a scenario where the audio quality is similar to a face-to-face conversation. In some examples, the VQS may be based on a signal-to-noise ratio (SNR) of the audio captured by the primary client device CD1 406A. In some examples, the VQS may be based on another VQS of the audio captured by the primary client device CD1 406A. In some examples, the VQS may be based on any combination of the MOS, SNR, and the other VQS. In an example, the threshold may be a baseline VQS score of 3.5.

At some point in time, either prior to the conference or during the conference, the primary client device CD1 406A or the server 402 may determine that User 1 has one or more associated secondary client devices, for example the secondary client device CD2 406B in this case. The primary client device CD1 406A or the server 402 may transmit a prompt to a client device associated with the remote conference participant, for example, the secondary client device CD2 406B. In some examples, the prompt may be transmitted to a primary client device, such as primary client device CD1 406A. The prompt may be a visual notification, an audio notification, a haptic notification, or any combination thereof. The prompt may be a request for permission to access a microphone of the secondary client device, a request for the participant to place the secondary client device on a table or in an area for suitable audio capture, or both. In another example, the prompt may be transmitted to one or more of the secondary devices CD3 406C through CDN 406N of the User N. The prompt used to request permission to access the microphone of a given client device is based on the conference and may be generally understood to be automatically revoked at an end of the conference. As such, the prompt is not a prompt which may be presented in connection with the download or installation of a software application (e.g., a client application) on the client device, such as to configure the general use of the software application. The automatic revocation of permission to access the microphone of a given user device may be determined based on a scheduled end time for the conference (e.g., according to scheduling/calendar data), a time at which the conference is actually ended using the conferencing software, or upon some duration of time (e.g., five minutes) passing without audio being captured after audio capture has occurred for the conference. The revocation of permission to access the microphone of a given client device may be subject to a user prompt, for example, the user may be requested to click a button if the conference is ongoing, in which case the duration of time will not operate to close the conference.

When permission to access the microphone of a given secondary client device, such as the secondary client device CD2 406B, is received, the primary client device CD1 406A or the server 402 may sample audio using the microphone of the secondary client device CD2 406B. The primary client device CD1 406A or the server 402 is configured to determine a VQS for the audio from User 1 based on the sampled audio from the microphone of the primary client device CD1 406A, the secondary client device CD2 406B, or both. This process is performed for each secondary client device for which permission to access the microphone is granted by the user thereof.

The primary client device CD1 406A or the server 402 are configured to determine whether the VQS of the audio from a given client device, such as the secondary client device CD2 406B, is greater than the VQS of the audio from the primary client device CD1 406A. Based on a determination that the VQS of the audio from the secondary client device CD2 406B is greater than the VQS of the audio from a client device, such as the primary client device CD1 406A, the primary client device CD1 406A or the server 402 causes the microphone of the secondary client device CD2 406B to capture audio for output to the conference. The secondary client device CD2 406B may communicate directly with the server 402 to output the audio to the conference. Alternatively, the secondary client device CD2 406B may communicate directly with the primary client device CD1 406A, which communicates with the server 402 to output the audio to the conference.

In some implementations, the primary client device 406A or the server 402 may sample audio using the microphones of some or all of the client devices at the location with a given remote conference participant. The sampling of the audio using the microphones of the client devices may be performed sequentially by client device or for all client devices substantially simultaneously. The amount of audio sampled from a given client device may vary.

In conventional conferencing software implementations, a different UI tile is added to the conferencing software UI for each device from which media of the conference is received. By way of contrast, in the implementations disclosed herein, the remote conference participants that have an associated primary client device and one or more secondary client devices may be displayed in a conferencing software UI as a single UI tile for the conference. As such, the use of a microphone of one of the secondary client devices will not cause a new UI tile to be displayed for the given remote conference participant; rather, the audio captured using the microphone of the secondary client device is associated with the existing UI tile of the remote conference participant. For example, the User 1 initially connects to the conference implemented by conferencing software running at the server 402 using the CD1 406A as a primary client device. A UI tile representing the User 1 is added to a UI of the conferencing software based on the connection of the CD1 406A to the conferencing software. A determination may at some point during the conference be made as described above to capture audio of the User 1 using the CD2 406B instead of (or in addition to) using the CD1 406A. In such a case, audio captured for the User 1 using a microphone or microphone array of the CD2 406B is output in connection with the UI tile associated with the User 1, without a second UI tile being added to the UI of the conferencing software for the CD2 406B.

In many cases, one or more or the remote conference participants may have with them one or more secondary client devices that are idle during the conference. When a secondary client device is idle, it may be associated with the conference based on, for example, a shared user account with the primary client device, and not currently being used for the conference. The primary client device CD1 406A or the server 402 configures a microphone of the one or more secondary client devices to capture audio for the respective remote conference participant.

In an example use case, User 1 may be participating in a conference using the primary client device CD1 406A while traveling in an automobile. The primary client device CD1 406A in this example may be a component of the automobile, such as an infotainment device, or a standalone device that is configured to communicate with the component of the automobile. At some point in time during the conference, the quality of the audio captured using a microphone of the primary client device CD1 406A may drop to an unacceptable level for the conference, for example, due to a hardware malfunction, interference caused by road noise, or User 1 being seated in the back of the automobile away from the microphone. In this example, the primary client device CD1 406A or the server 402 may determine that the audio quality is below a threshold by sampling audio signals using the microphone of the primary client device CD1 406A. The audio quality may be determined by calculating a VQS of the audio captured by the microphone of the primary client device CD1 406A.

At some point in time, either prior to the conference or during the conference, the primary client device CD1 406A or the server 402 may determine that User 1 has one or more associated secondary client devices, for example the secondary client device CD2 406B in this case. The primary client device CD1 406A or the server 402 may transmit a prompt to the secondary client device CD2 406B. The prompt may be a visual notification, an audio notification, a haptic notification, or any combination thereof. The prompt may be a request for permission to access a microphone of the secondary client device CD2 406B, a request for the remote conference participant to place the client device on a table or in an area for suitable audio capture, or both.

When permission to access the microphone of the secondary client device CD2 406B is received, the primary client device CD1 406A or the server 402 may sample audio using the microphone of the secondary client device CD2 406B. The primary client device CD1 406A or the server 402 is configured to determine a VQS for the audio from User 1 based on the sampled audio from the microphone of the primary client device CD1 406A, the secondary client device CD2 406B, or both.

The primary client device CD1 406A or the server 402 are configured to determine whether the VQS of the audio captured from the microphone of the secondary client device CD2 406B is greater than the VQS of the audio captured from the microphone of the primary client device CD1. Based on a determination that the VQS of the audio captured from the microphone of the secondary client device CD2 406B is greater than the VQS of the audio captured from the microphone of the primary client device CD1 406A, the primary client device CD1 406A or the server 402 cause the microphone of the secondary client device CD2 406B to capture audio for output to the conference without adding a UI tile to the conference UI. The secondary client device CD2 406B may communicate directly with the server 402 to output the audio to the conference. Alternatively, the secondary client device CD2 406B may communicate directly with the primary client device CD1 406A, which communicates with the server 402 to output the audio to the conference.

In another example use case, User 2 may be participating in a conference using the primary client device CD3 406C. In this example, the primary client device CD3 406C or the server 402 may determine that the audio quality from User 2 is below a threshold by sampling audio signals using the one or more microphones of the primary client device CD3 406C and determining a VQS for the audio.

At some point in time, either prior to the conference or during the conference, the primary client device CD3 406C or the server 402 may determine that User 2 has one or more associated secondary client devices, for example, the secondary client devices CD4 406D through CDN 406N. The primary client device CD3 406C or the server 402 may transmit a prompt to the one or more associated secondary client devices CD4 406D through CDN 406N. The prompt may be a visual notification, an audio notification, a haptic notification, or any combination thereof. The prompt may be a request for permission to access a microphone of the secondary client device, a request for the participant to place the client device on a table or in an area for suitable audio capture, or both. In an example where the secondary client device is a voice assistant device, the server 402 may transmit the prompt to the primary client device CD3 406C or one of the other associated secondary client devices CD4 406D through CDN 406N. Based on a received input from a user in response to the prompt, the primary client device CD3 406C or one of the other associated secondary client devices CD4 406D through CDN 406N may transmit a message to the voice assistant device to configure the voice assistant device to capture audio for the conference.

The primary client device CD3 406C or the server 402 may sample audio using the microphone of any client device that has granted permission to access the microphone of the respective client device. In some implementations, the primary client device CD3 406C or the server 402 may sample audio using the microphones of all the secondary client devices CD4 406D through CDN 406N located within the location 404N. The sampling of the audio using the microphones of the secondary client devices CD4 406D through CDN 406N may be performed sequentially or all the secondary client devices CD4 406D through CDN 406N substantially simultaneously.

In this example, the primary client device CD3 406C or the server 402 may sample audio from User 2 using the respective microphones of secondary client devices CD4 406D through CDN 406N. The primary client device CD3 406C or the server 402 are configured to determine a VQS for the audio from User 2 based on the sampled audio from the respective microphones of secondary client devices CD4 406D through CDN 406N.

The primary client device CD3 406C or the server 402 are configured to determine whether any of the VQSs of the audio from the secondary client devices CD4 406D through CDN 406N are greater than the VQS of the primary client device CD3 406C. In this example, the primary client device CD3 406C or the server 402 may determine that the audio from secondary client device CD4 406D has the highest VQS. Based on a determination that the VQS of the audio from the secondary client device CD4 406D is greater than the VQS of the audio from the primary client device CD3 406C, the primary client device CD3 406C or the server 402 causes the microphone of the secondary client device CD4 406D to capture audio of User 2 for output to the conference without adding a user interface tile to the conference user interface.

In another example use case, User 1 may be participating in a conference using the primary client device CD1 406A. At some point in time during the conference, the quality of the audio captured using a microphone of the primary client device CD1 406A may drop to an unacceptable level for the conference, for example, due to a hardware malfunction or user action. In this example, the primary client device CD1 406A may determine that the audio quality is below a threshold.

At some point in time, either prior to the conference or during the conference, the primary client device CD1 406A or the server 402 may determine that User 1 has one or more associated secondary client devices, for example the secondary client device CD2 406B in this case. The primary client device CD1 406A or the server 402 may transmit a prompt to the secondary client device CD2 406B. The prompt may be a visual notification, an audio notification, a haptic notification, or any combination thereof. The prompt may be a request for permission to access a microphone of the secondary client device CD2 406B, a request for the participant to place the client device on a table or in an area for suitable audio capture, or both. At some point in time, either prior to the conference or during the conference, permission to access the microphone of the secondary client device CD2 406B is received by the primary client device CD1 406A.

When the primary client device CD1 406A detects that the audio quality is below a threshold, the primary client device CD1 406A transmits a message (e.g., via Bluetooth) to the secondary client device CD2 406B to sample audio using the microphone of the secondary client device CD2 406B. The primary client device CD1 406A or the server 402 is configured to determine a VQS for the audio from User 1 based on the sampled audio from the microphone of the secondary client device CD2 406B. If the VQS for the audio captured using the microphone of the secondary client device CD2 406B is greater than a threshold, the primary client device CD1 406A or the server 402 causes the microphone of the secondary client device CD2 406B to capture audio for output to the conference without adding a UI tile to the conference UI. The secondary client device CD2 406B may communicate directly with the server 402 to output the audio to the conference. Alternatively, the secondary client device CD2 406B may communicate directly with the primary client device CD1 406A, which communicates with the server 402 to output the audio to the conference.

As has been described, the processing herein including to prompt client devices for microphone access permission, sampling audio of client devices, determining VQSs for audio sampled from client devices, and selecting audio capture devices based on VQSs may be performed wholly by a primary client device, wholly by the server 402, or partially by a primary client device and partially by the server 402. Where the processing is performed wholly by a primary client device, such as the primary client device CD1 406A, a connection between the secondary client device CD2 406B and the primary client device CD1 406A may be established upon receiving permission from the secondary client device CD2 406B to access the microphone of the secondary client device CD2 406B. Once the connection between the secondary client device CD2 406B and the primary client device CD1 406A is established, audio may be captured from the microphone of the secondary client device CD2 406B and transmitted to the primary client device CD1 406A. The primary client device CD1 406A is configured to output the audio captured using the microphone of the secondary client device CD2 406B to the conference. Where the processing is performed wholly by the server 402, a connection between the server 402 and the secondary client device CD2 406B may be established upon receiving permission from the secondary client device CD2 406B to access the microphone of the secondary client device CD2 406B. Once the connection between the server 402 and the secondary client device CD2 406B is established, the secondary client device CD2 406B captures audio using its microphone and transmits the audio to the server 402. The server 402 is configured to output the audio captured using the microphone of the secondary client device CD2 406B to the conference. Where the processing is performed partially by each of the primary client device CD1 406A and the server, a connection between the primary client device CD1 406A and the secondary client device CD2 406B may be established upon receiving permission from the secondary client device CD2 406B to access the microphone of the secondary client device CD2 406B. Once the connection between the primary client device CD1 406A and the secondary client device CD2 406B is established, audio may be captured from the microphone of the secondary client device CD2 406B and transmitted to the primary client device CD1 406A. The primary client device CD1 406A transmits the audio captured using the microphone of the secondary client device CD2 406B to the server 402. The server 402 outputs the audio captured using the microphone of the secondary client device CD2 406B to the conference.

In an example, the conferencing system 400 can be used in academic settings to support audio capture for remote teachers and/or students in a virtual classroom, such as to improve audio quality of the captured audio for other teachers, students, or guests virtually connected to a class session over the conferencing software. In another example, the conferencing system 400 can be used in an office setting where there are multiple participants in the conference participating from different rooms. In yet another example, the conferencing system 400 can be used for expos, webinars, and other event presentations with virtual components in which audience audio capture is important.

To further describe some implementations in greater detail, reference is next made to examples of methods that may be performed by or using a system for audio capture device selection in a conference for improved audio quality. FIGS. 5-8 are flowcharts of examples of methods for audio capture device selection for remote conference participants. The methods 500, 600, 700, and 800 can be executed using computing devices, such as the systems, hardware, and software described with respect to FIGS. 1-4. The methods 500, 600, 700, and 800 can be performed, for example, by executing a machine-readable program or other computer-executable instructions, such as routines, instructions, programs, or other code. The steps, or operations, of the methods 500, 600, 700, 800, or another technique, method, process, or algorithm described in connection with the implementations disclosed herein can be implemented directly in hardware, firmware, software executed by hardware, circuitry, or a combination thereof.

For simplicity of explanation, the methods 500, 600, 700, and 800 are depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Figure 5:
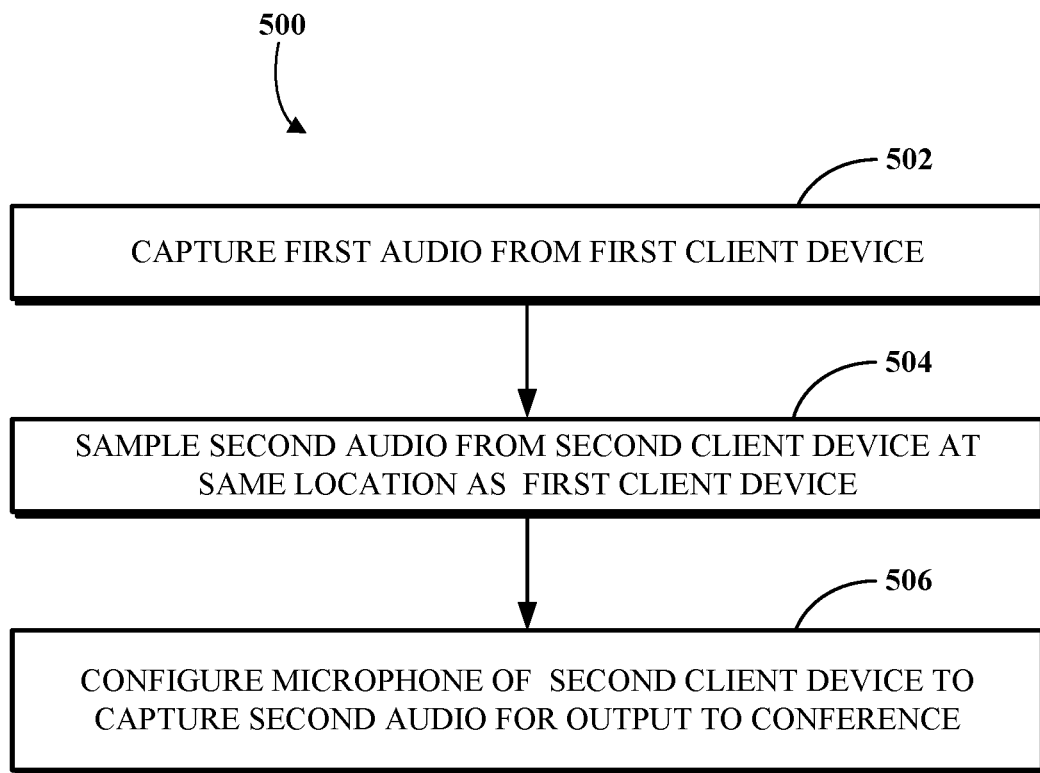
FIG. 5 is a flow diagram of an example of a method for audio capture device selection for remote conference participants.

FIG. 5 is a flow diagram of an example of a method 500 for audio capture device selection for remote conference participants. At 502, the method 500 includes capturing first audio during a conference using a microphone of a first client device. The first client device is connected to conferencing software that implements a conference. The first client device may be a primary client device that is associated with a user account and is used to join and participate in an audio component of the conference, a video component of the conference, or both. The first audio is audio from one or more remote conference participants that is captured by the microphone of their respective primary client device. The first audio captured by the respective primary client device microphone is output to the conference such that other participants can listen to the audio component of the conference using their respective client devices.

At 504, the method 500 includes sampling second audio from a microphone of a second client device that is at the same location as the first client device. Sampling the second audio may include determining a quality score, such as a VQS, for the audio from the microphone of the second client device. In some examples, the sampling of the audio from the microphone of the second client device may be triggered when a VQS of the audio from the microphone of the first client device falls below a threshold. In some examples, the method 500 may include periodically resampling audio using the microphone of the first client device and the microphone of the second client device to update the quality scores for the audio from the first client device and the second client device.

The second client device may be a secondary client device that is associated with the same user account as the first client device. The second audio from the microphone of the second client device may be sampled periodically or based on a triggering event, such as detecting a keyword or phrase using speech detection. For example, if a keyword or phrase such as "Todd, I cannot hear you," or "Can you speak up Todd?" is detected, it may be determined that one of the primary devices in the conference currently used to capture audio from the conference participant named Todd may need to be switched to another audio capture device (e.g. a secondary client device) that belongs to the conference participant to improve audio performance over the current audio capture device. In another example, the second audio from the microphone of the second client device may be sampled periodically to determine whether the quality of the audio from the microphone of the first client device, the microphone of the second client device, or both, are below a threshold. If it is determined that the audio quality from the currently used microphone is below a threshold, the conferencing system may determine that a switch to another microphone is needed.

In some examples, the method 500 may include detecting the second client device and/or transmitting a prompt to the second client device at the start of the conference or during the conference. In an example, the second client device may be detected based on a determination that the second client device is at the same location as the first client device and/or associated with the same user account as the first client device. In another example, the second client device may be detected based on a determination that the second client device is associated with the same network as the first client device, for example, by determining that the IP address of the first client device and the IP address of the second client device share a subnet mask. The prompt may be a visual notification, an audible notification, a haptic notification, or any combination thereof. The prompt may indicate that the audio of the conference may be improved if the user places the second client device (e.g., mobile phone, tablet, or laptop) on a table within or in an area that improves audio capture. The prompt may include a request for permission for the conference system to access the microphone of the second client device to be used by the conference system to capture audio for output to the conference. When the conference system receives permission from the second client device, the conference system opens an audio channel between a server of the conference system and the second client device. The prompt may be transmitted to the second client device responsive to a determination that the second client device and the first client device are at the same location (e.g., based on one or more of the factors described above). Alternatively, the prompt may be transmitted to the second client device at some time further after the determination is made that the second client device and the first client device are at the same location. For example, the prompt may be transmitted to the second client device responsive to a VQS for audio captured using the microphone of the first client device being below a threshold. A determination that permission to access the microphone of the second client device has been granted may be based on receiving a message from the second client device in response to the request. The message may indicate that access to the microphone of the second client device has been granted. In some examples, the sampling of the second audio at 504 may be based on a determination that permission to access the microphone of the second client device has been granted.

At 506, the method 500 includes configuring a microphone of the second client device to capture the second audio for output to the conference. The second audio is audio from one or more remote conference participants that is captured by the microphone of a respective client device. The second audio captured by the microphone of the second client device is output to the conference such that other participants can listen to the audio component of the conference using their respective client devices. Capturing the second audio using the microphone of the second client device may thus be understood to include determining to capture the second audio using the microphone of the second client device. Configuring the microphone of the second client device to capture the second audio may be based on the quality score of the audio from the microphone of the second client device being greater than the quality score of the audio from the microphone of the first client device. In some examples, capturing the second audio using the microphone of the second client device may be based on a difference between the quality score of the first client device and the quality score of the second client device being above a threshold. When the determination to capture the second audio using the microphone of the user device is made, the microphone of the first client device may be automatically muted to prevent feedback. When the second audio is being captured using the microphone of the user device, the audio signals from the second client device are transmitted to the server of the conference system via the audio channel opened between the second client device and the server. The server then transmits the audio captured by the microphone of the second client device for output to the conference without adding a new UI tile to the conference UI.

In some implementations, audio captured from microphones of multiple client devices at the same location may be sampled. The sampling of the audio captured from microphones of multiple client devices at the same location may be performed sequentially or substantially simultaneously. For example, if it is determined that the audio quality from the microphone of the first client device is below a threshold, the conferencing system may sample a microphone of a second client device to determine whether the audio quality from the microphone of the second client device is greater than the audio quality from the microphone of the first client device. If it is determined that the audio quality from the microphone of the second client device is not greater than the audio quality from the microphone of the first client device, the conferencing system may sample audio captured from a microphone of another client device at the same location and repeat the process until the audio quality from a microphone of a client device is found to be greater than the audio quality from the microphone of the first client device. Alternatively, the conferencing system may sample audio from the microphones of all the client devices determined to be at the same location as the first client device simultaneously or substantially simultaneously.

Figure 6:
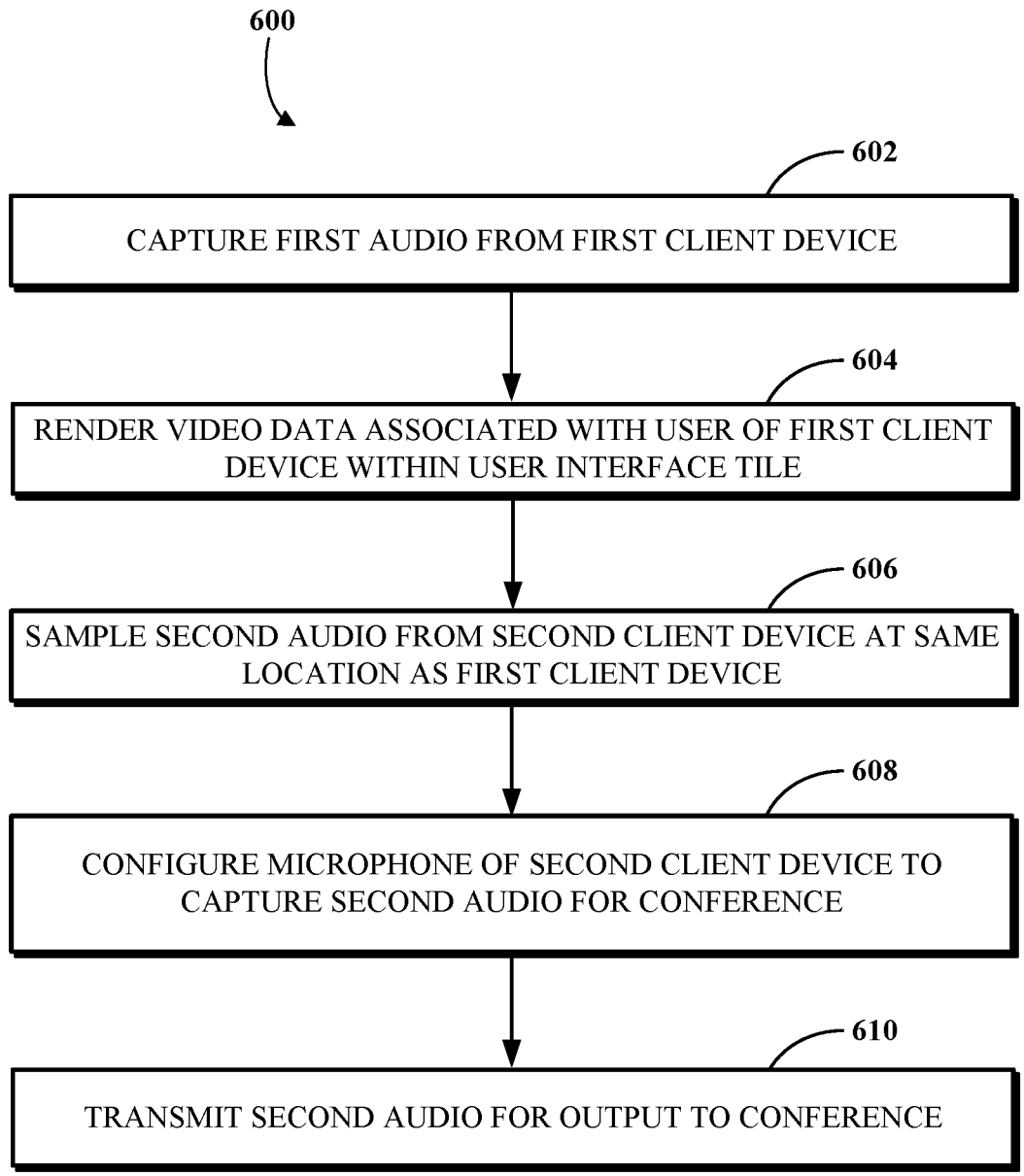
FIG. 6 is a flow diagram of another example of a method for audio capture device selection for remote conference participants.

FIG. 6 is a flow diagram of an example of a method 600 for audio capture device selection for remote conference participants. At 602, the method 600 includes capturing first audio during a conference using a microphone of a first client device. The first client device is connected to conferencing software that implements a conference. The first client device may be a primary client device that is associated with a user account and is used to join and participate in an audio component of the conference, a video component of the conference, or both.

At 604, the method 600 includes rendering video data associated with the user of the first client device within a UI tile of the conferencing software. The rendered video data is displayed on all primary client devices in the conference that are configured with a display. The first audio captured using the microphone of the first device is associated with the user of the first client device within the UI tile of the conferencing software.

At 606, the method 600 includes sampling second audio from a second client device that is at the same location as the first client device. Sampling the second audio may include determining a quality score, such as a VQS, for the audio from the microphone of the second client device. In some examples, the sampling of the audio from the second client device may be triggered when a VQS of the audio from the microphone of the first client device falls below a threshold. In some examples, the method 600 may include periodically resampling audio using the microphone of the first client device and the microphone of the second client device to update the quality scores for the audio from the first client device and the second client device.

The second client device may be a secondary client device that is associated with the same user account as the first client device. The second audio from the second client device may be sampled periodically or based on a triggering event, such as detecting a keyword or phrase using speech detection.

In some examples, the method 600 may include detecting the second client device and/or transmitting a prompt to the second client device at the start of the conference or during the conference, such as discussed with reference to FIG. 5. At 608, the method 600 includes configuring a microphone of the second client device to capture the second audio for output to the conference, as discussed with reference to FIG. 5.

At 610, the server transmits the audio captured by the microphone of the second client device for output to the conference. The audio captured by the microphone of the second client device may be output to the conference in connection with the UI tile within which the video data of the user of the first client device is rendered. Accordingly, a new UI tile is not added to the conference UI when capturing audio using the microphone of the second client device for the conference.

Figure 7:
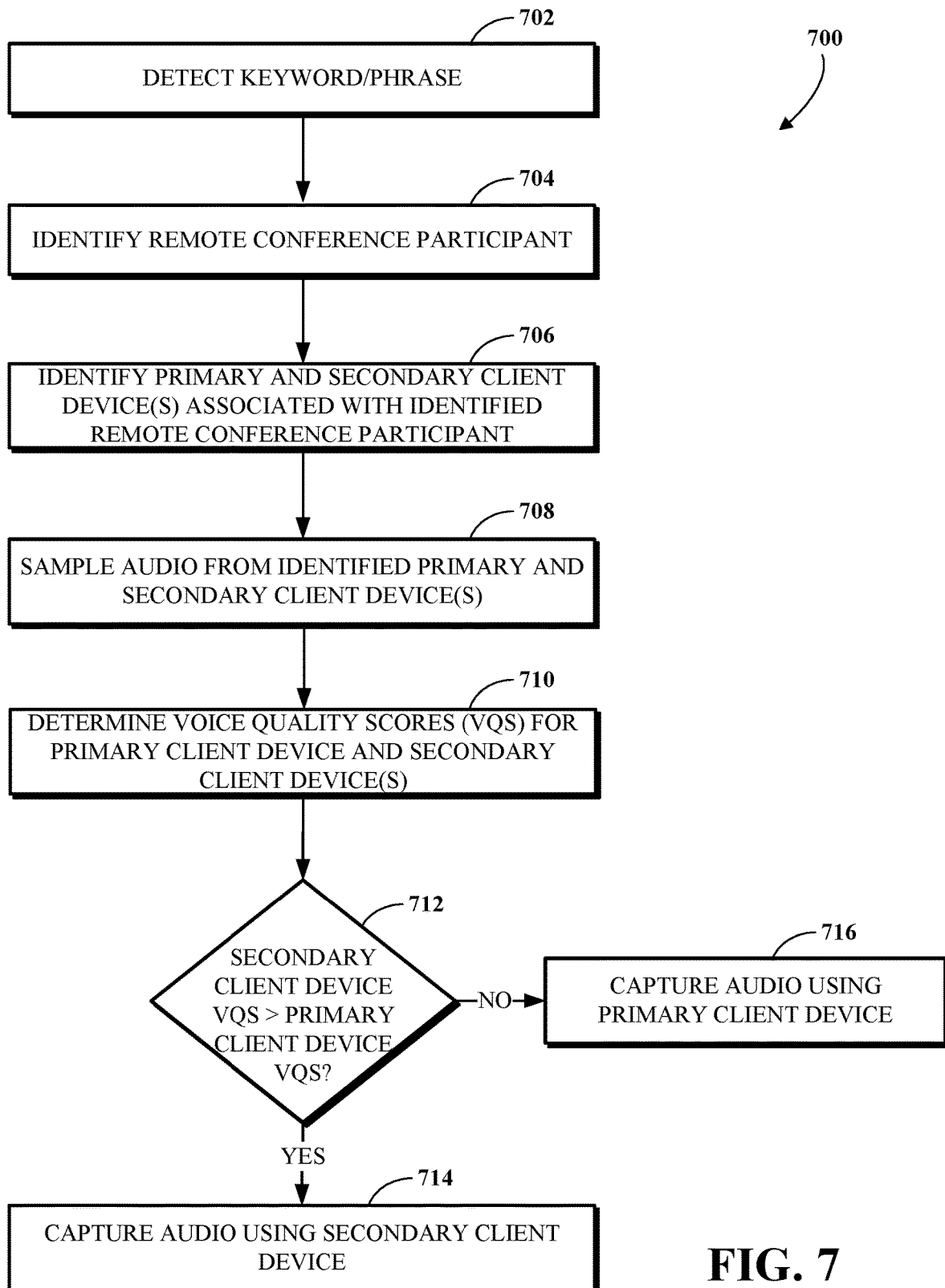
FIG. 7 is a flow diagram of an example of a method for keyword or phrase detection in a conference for audio capture device selection for remote conference participants.

FIG. 7 is a flow diagram of an example of a method 700 for keyword or phrase detection in a conference for audio capture device selection. In some cases, the method 700 may be implemented in conjunction with the method 500 shown in FIG. 5, for example at operation 502, or the method 600 shown in FIG. 6, for example at operation 602. At 702, the method 700 includes detecting a keyword or phrase in audio of a conference. The audio that is output to the conference may be obtained using one or more microphones of a client device. The client device may be a primary client device or a secondary client device. The keyword or phrase may be detected using speech detection.

The keyword or phrase is a word or group of words detected in an audio stream of the conference that indicates that the audio quality captured for one or more remote conference participants is low. The conferencing system may perform voice detection to detect whether the audio stream includes speech. If it is determined that the audio stream includes speech, the conferencing system performs a speech-to-text conversion and determines whether the text includes a keyword or phrase by comparing the text to a database that stores keywords and phrases. The conferencing system may process the text using a machine learning (ML) algorithm to determine new keywords and phrases and update the database accordingly.

In an example, the keyword or phrase may include an identifier associated with a remote conference participant and an indication that the audio quality captured for the remote conference participant is low. For example, in the phrase "Your voice sounds distant, Steve," which may be spoken by another remote conference participant, the identifier associated with the remote conference participant may be the name of the remote conference participant (i.e., "Steve"), and the indication that the audio quality is low may be the portion of the phrase "Your voice sounds distant."

At 704, the method 700 includes identifying the remote conference participant. Identifying the remote conference participant may include parsing the detected phrase to determine an identifier associated with a remote conference participant. In this example, the remote conference participant may be identified by detecting the name of the remote conference participant in the phrase. The identification of the remote conference participant may be based on a determination that the remote conference participant is in attendance at the conference, for example, based on a user account status. For example, if the identifier associated with the remote conference participant is "Steve," the conferencing system will search for a remote conference participant named Steve that is in attendance at the conference. If there are multiple remote conference participants associated with the identifier in attendance at the conference, the conferencing system may identify each of these remote conference participants as a candidate remote conference participant. In some examples, if there are multiple remote conference participants associated with the identifier in attendance at the conference, the conferencing system may sample audio from each client device associated with each of the candidate remote conference participants that has granted access to the microphones of their respective client devices to identify the remote conference participant.

At 706, the method 700 includes identifying the primary client device associated with the identified remote conference participant and one or more secondary client devices associated with the identified remote conference participant. The primary and secondary client devices may be identified based on a user account, or based on a determination that the IP address of the one or more secondary client devices share a subnet mask with the IP address of the primary client device. In some examples, more than one secondary client devices (e.g., a mobile phone and a tablet computer) may be identified for a given remote conference participant.

At 708, the method 700 includes sampling audio using a microphone of the identified primary client device and the microphones of the one or more identified secondary client devices. The audio may be sampled from the start of the audio capture for a predetermined time after speech is detected. In some cases, where applicable, multiple microphones of the primary or secondary client device, or a combination of microphones, may be used to sample the audio.

At 710, the method 700 includes determining a VQS for the audio from the microphone of the identified primary client device and the microphones of the one or more secondary client devices. In some cases where the identified primary client device or secondary client device has multiple microphones, a VQS for the audio from each microphone may be determined. A determination may then be made as to which microphone or combination of microphones produces the best audio signal based on their respective VQSs.

At 712, the method 700 includes determining whether the VQS of the audio from the microphone of the secondary client device is greater than a determined VQS of the audio from the microphone of the primary client device. If the VQS of the audio from the microphone of the secondary client device is determined to be greater than the VQS of the audio from the microphone of the primary client device, then the method 700 includes determining to capture audio using a microphone of the secondary client device and capturing audio using the microphone of the secondary client device for output to the conference at 714. If the VQS of the audio from the microphone of the secondary client device is determined to be less than or equal to the VQS of the audio from the microphone of the primary client device, then the method 700 includes capturing audio using the microphone of the primary client device at 716. In some examples, the sampling of the audio may include sampling audio from all of the secondary client devices determined to be at the same location as the primary client device simultaneously or substantially simultaneously.

Figure 8:
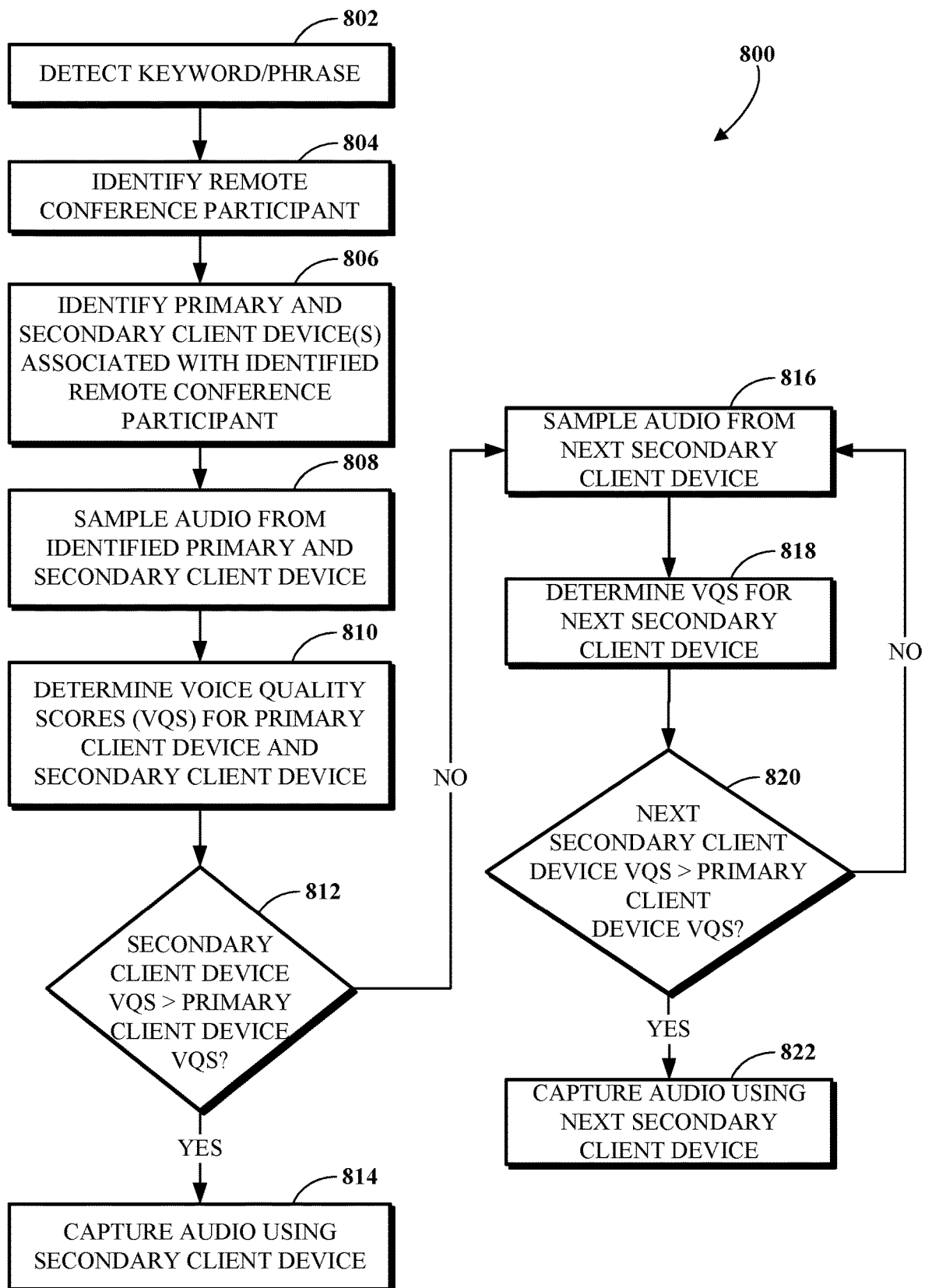
FIG. 8 is a flow diagram of another example of a method for keyword or phrase detection in a conference for audio capture device selection for remote conference participants.

FIG. 8 is a flow diagram of another example of a method 800 for keyword or phrase detection in a conference for audio capture device selection. In some cases, the method 800 may be implemented in conjunction with the method 500 shown in FIG. 5, for example at operation 502, or the method 600 shown in FIG. 6, for example at operation 602. At 802, the method 800 includes detecting a keyword or phrase in audio of a conference. The audio that is output to the conference may be obtained using one or more microphones of a client device. The client device may be a primary client device or a secondary client device. The keyword or phrase may be detected using speech detection.

The conferencing system may perform voice detection to detect whether the audio stream includes speech. If it is determined that the audio stream includes speech, the conferencing system performs a speech-to-text conversion and determines whether the text includes a keyword or phrase by comparing the text to a database that stores keywords or phrases. The conferencing system may process the text using an ML algorithm to determine new keywords and phrases and update the database accordingly.

In an example, the keyword or phrase may include an identifier associated with a remote conference participant and an indication that the audio quality captured for the remote conference participant is low. For example, in the phrase "Mary, we are having trouble hearing you," which may be spoken by another remote conference participant, the identifier associated with the remote conference participant may be the name of the remote conference participant (i.e., "Mary"), and the indication that the audio quality is low may be the portion of the phrase "trouble hearing you."

At 804, the method 800 includes identifying the remote conference participant. Identifying the remote conference participant may include parsing the detected phrase to determine an identifier associated with a remote conference participant. In this example, the remote conference participant may be identified by detecting the name of the remote conference participant in the phrase. The identification of the remote conference participant may be based on a determination of whether the remote conference participant is in attendance at the conference, for example, based on a user account status. For example, if the identifier associated with the remote conference participant is "Mary," the conferencing system will search for a remote conference participant named Mary that is in attendance at the conference. If there are multiple remote conference participants associated with the identifier in attendance at the conference, the conferencing system may identify each of these remote conference participants as a candidate remote conference participant. In some examples, if there are multiple remote conference participants associated with the identifier in attendance at the conference, the conferencing system may sample audio from each client device associated with each of the candidate remote conference participants to identify the remote conference participant.

At 806, the method 800 includes identifying the primary client device associated with the identified remote conference participant and one or more secondary client devices associated with the identified remote conference participant. The primary and secondary client devices may be identified based on a user account, or based on a determination that the IP address of the one or more secondary client devices share a subnet mask with the IP address of the primary client device. In some examples, it may be determined that more than one secondary client device (e.g., a mobile phone and a voice assistant device) is identified for a given remote conference participant.

At 808, the method 800 includes sampling audio using a microphone of the identified primary client device and the microphones of the one or more identified secondary client devices. The audio may be sampled from the start of the audio capture and for a predetermined time after speech is detected. In some cases, where applicable, multiple microphones of the identified primary client device and/or secondary client device may be used to sample the audio.

At 810, the method 800 includes determining a VQS for the audio from the microphone of the identified primary client device and the microphones of the one or more secondary client devices. In some cases where the identified primary client device or secondary client device has multiple microphones, a VQS for the audio from each microphone may be determined. A determination may then be made as to which microphone or combination of microphones produces the best audio signal based on their respective VQSs.

At 812, the method 800 includes determining whether the VQS of the audio from the microphone of the secondary client device is greater than a determined VQS of the audio from the microphone of the primary client device. If the VQS of the audio from the microphone of the secondary client device is determined to be greater than the VQS of the audio from the microphone of the primary client device, then the method 800 includes determining to capture audio using a microphone of the secondary client device and capturing audio using the microphone of the secondary client device for output to the conference at 814. If the VQS of the audio from the microphone of the secondary client device is determined to be less than or equal to the VQS of the audio from the microphone of the primary client device, then the method 800 includes sampling audio from a next identified secondary device at 816.

At 818, the method 800 includes determining a VQS for the audio from the next secondary client device associated with the remote conference participant. Some of the secondary client devices may have multiple microphones. If the secondary client device has multiple microphones, a VQS for the audio from each microphone may be determined, and a determination may be made as to which microphone or combination of microphones produces the best audio signal based on their respective VQSs.

At 820, the method 800 includes determining whether the VQS of the audio from the next secondary client device with the highest VQS of the other client devices is greater than the determined VQS of the audio from the primary client device. If the VQS of the audio from the microphone of the next secondary client device with the highest VQS is determined to be greater than the VQS of the audio from the microphone of the primary client device, then the method 800 includes capturing audio from the microphone of the next secondary client device that has the highest VQS of the secondary devices for output to the conference at 822. If the VQS of the audio from the microphone of the next secondary client device is determined to be less than or equal to the VQS of the audio from the microphone of the primary client device, then the method 800 may include sampling audio from a microphone of a next secondary client device at 816. Operations 816-820 may be repeated until a secondary device is found that has a VQS greater than the VQS of the primary client device.

Figure 9A:
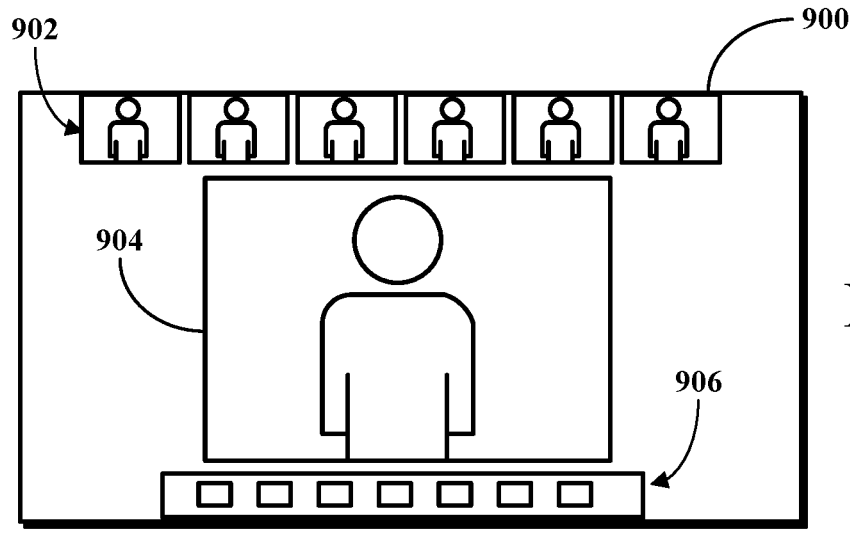
FIGS. 9A-B are illustrations of examples of user interfaces (UIs) output for display in a conference for audio capture device selection.
Figure 9B:
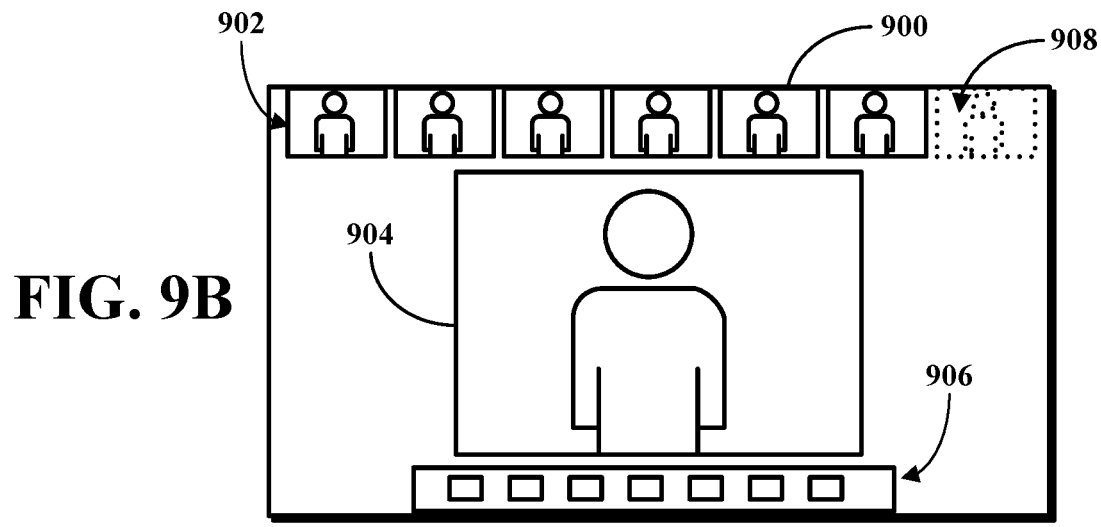

FIGS. 9A-B are illustrations of examples of UIs output for display in a conference for audio capture device selection. FIG. 9A shows a UI output 900 for a conference that includes multiple UI tiles 802 for various conference participants, a main speaker UI tile 904 for a conference participant who is actively speaking, and controls 906. In this example, the main speaker UI tile 904 may be a single UI tile used to represent the video and audio of a remote conference participant or all of the video and audio of the participants in a conference room. Referring next to FIG. 9B, in a typical conferencing system, when a remote conference participant that is attending a conference joins the conference with a secondary client device, a UI tile 908 representing the remote conference participant of the secondary client device is displayed in the conference even though the remote conference participant is already represented by a UI tile, such as the main speaker UI tile 904. Accordingly, the remote conference participant would be represented in multiple UI tiles, such as the main speaker UI tile 904 in this example, and the UI tile 908. If the remote conference participant has multiple secondary client devices, each secondary client device would be represented as an individual UI tile in a typical conferencing system. This can lead to unnecessary clutter in the UI output 900. In the implementations disclosed herein, individual tiles for secondary client devices, such as UI tile 908, are not displayed in the conference when using the microphone of the secondary client device for output to the conference. Accordingly, when secondary client devices are capturing audio for output to the conference, the UI output 900 shown in FIG. 9A would be displayed such that secondary client devices associated with the remote conference participant are not shown as individual UI tiles.

Disclosed herein are, inter alia, implementations of systems and techniques for device management, for example, by configuring any device such as a telephony device or a video device to operate on a virtual meeting room platform.

One aspect of this disclosure is a method that includes capturing first audio using a microphone of a first client device connected to conferencing software implementing a conference, wherein video data associated with a user of the first client device is rendered within a user interface tile of the conferencing software. The method includes sampling second audio using a microphone of a second client device at a same location as the first client device based on a first quality score for the first audio being below a threshold. The method includes configuring the microphone of the second client device to capture the second audio for output to the conference based on a second quality score for the second audio being higher than the first quality score for the first audio.

Another aspect of this disclosure is a system for audio capture in a conference. The system includes a memory and a processor. The processor is configured to execute instructions stored in the memory. The processor is configured to capture first audio using a microphone of a first client device connected to conferencing software implementing a conference, wherein video data associated with a user of the first client device is rendered within a user interface tile of the conferencing software. The processor is configured to sample second audio using a microphone of a second client device at a same location as the first client device based on a first quality score for the first audio being below a threshold. The processor is configured to configure the microphone of the second client device to capture the second audio for output to the conference based on a second quality score for the second audio being higher than the first quality score for the first audio.

Another aspect of this disclosure includes a non-transitory computer-readable medium storing instructions operable to cause one or more processors to perform operations. The operations include capturing first audio using a microphone of a first client device connected to conferencing software implementing a conference, wherein video data associated with a user of the first client device is rendered within a user interface tile of the conferencing software. The operations include sampling second audio using a microphone of a second client device at a same location as the first client device based on a first quality score for the first audio being below a threshold. The operations include configuring the microphone of the second client device to capture the second audio for output to the conference based on a second quality score for the second audio being higher than the first quality score for the first audio.

Another aspect of this disclosure includes a method that includes capturing first audio using a microphone of a first client device connected to a conference. The method incudes sampling second audio using a microphone of a second client device. The method includes configuring the microphone of the second client device to capture the second audio for output to the conference based on a quality score of the second audio being higher a quality score of the first audio.

An aspect of this disclosure includes a system for audio capture in a conference. The system includes a memory and a processor. The processor is configured to execute instructions stored in the memory to capture first audio using a microphone of a first client device connected to a conference. The processor is configured to execute instructions stored in the memory to sample second audio using a microphone of a second client device. The processor is configured to execute instructions stored in the memory to configured the microphone of the second client device to capture the second audio for output to the conference based on a quality score of the second audio being higher than a quality score of the first audio.

An aspect of this disclosure includes a non-transitory computer-readable medium that stores instructions operable to cause one or more processors to perform operations. The operations include capturing first audio using a microphone of a first client device connected to a conference. The operations include sampling second audio using a microphone of a second client device. The operations include configuring the microphone of the second client device to capture the second audio for output to the conference based on a quality score of the second audio being higher than a quality score of the first audio.

In one or more aspects, the method includes periodically resampling the first audio using the microphone of the first client device and the second audio using the microphone of the second client device to update the first quality score and the second quality score. In one or more aspects, the second audio is output during the conference in connection with the user interface tile within which the video data associated with the user of the first client device is rendered. In one or more aspects, configuring the first client device includes muting the microphone of the first client device when capturing the second audio using the microphone of the second client device. In one or more aspects, the method includes performing keyword detection to determine a keyword or phrase that indicates that the first audio from the first client device is of low quality, wherein the sampling of the second audio using the microphone of the second client device is triggered based on the keyword detection. In one or more aspects, the method includes determining that the second client device shares a conference participant account with the first client device. In one or more aspects, the method includes determining that an IP address of the second client device and an IP address of the first client device share a subnet mask. In one or more aspects, the method includes transmitting a request for permission to access the microphone of the second client device.

In one or more aspects, a processor is configured to periodically resample the first audio using the microphone of the first client device and the second audio using the microphone of the second client device to update the first quality score and the second quality score. In one or more aspects, the processor is configured to output the second audio during the conference in connection with the user interface tile within which the video data associated with the user of the first client device is rendered. In one or more aspects, the processor is configured mute the microphone of the first client device when capturing the second audio using the microphone of the second client device. In one or more aspects, the processor is configured to perform keyword detection to determine a keyword or phrase that indicates that the first audio from the first client device is of low quality, wherein the sampling of the second audio using the microphone of the second client device is triggered based on the keyword detection. In one or more aspects, the processor is configured to determine that the second client device shares a conference participant account with the first client device. In one or more aspects, the processor is configured to determine that an IP address of the second client device and an IP address of the first client device share a subnet mask. In one or more aspects, the processor is configured to transmit a request for permission to access the microphone of the second client device.

In one or more aspects, one or more processors are configured to perform operations including periodically resampling the first audio using the microphone of the first client device and the second audio using the microphone of the second client device to update the first quality score and the second quality score. In one or more aspects, one or more processors are configured to perform operations including outputting the second audio during the conference in connection with the user interface tile within which the video data associated with the user of the first client device is rendered. In one or more aspects, one or more processors are configured to perform operations including performing keyword detection to determine a keyword or phrase that indicates that the first audio from the first client device is of low quality, wherein the sampling of the second audio using the microphone of the second client device is triggered based on the keyword detection. In one or more aspects, one or more processors are configured to perform operations including determining that the second client device shares a conference participant account with the first client device. In one or more aspects, one or more processors are configured to perform operations including determining that an IP address of the second client device and an IP address of the first client device share a subnet mask. In one or more aspects, one or more processors are configured to perform operations including transmitting a request for permission to access the microphone of the second client device.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    capturing first audio using a microphone of a first client device connected to a conference;
    performing keyword detection to determine a keyword that indicates that the first audio is of low quality;
    sampling second audio using a microphone of a second client device;
    determining that the second client device shares a conference participant account with the first client device; and
    responsive to the determination that the second client device shares the conference participant account with the first client device, configuring the microphone of the second client device to capture the second audio for output to the conference when a quality score of the second audio being is higher than a quality score of the first audio.

2. The method of claim 1, comprising:
    resampling the first audio using the microphone of the first client device and the second audio using the microphone of the second client device to update the quality score of the first audio and the quality score of the second audio.

3. The method of claim 1, wherein the second audio is output during the conference in connection with a user interface tile within which video data associated with a user of the first client device is rendered.

4. The method of claim 1, wherein configuring the first client device includes muting the microphone of the first client device when capturing the second audio using the microphone of the second client device.

5. The method of claim 1, wherein the sampling of the second audio using the microphone of the second client device is triggered based on the keyword detection.

6. The method of claim 1, comprising:
transmitting a request for permission to access the microphone of the second client device.

7. The method of claim 1, comprising:
determining that an internet protocol (IP) address of the second client device and an IP address of the first client device share a subnet mask; and
transmitting a request for permission to access the microphone of the second client device.

8. A system for audio capture in a conference, the system comprising:
a memory; and
a processor configured to execute instructions stored in the memory to:
capture first audio using a microphone of a first client device connected to a conference;
perform keyword detection to determine a keyword that indicates that the first audio is of low quality;
sample second audio using a microphone of a second client device;
determine that the second client device shares a conference participant account with the first client device; and
responsive to the determination that the second client device shares the conference participant account with the first client device, configure the microphone of the second client device to capture the second audio for output to the conference when a quality score of the second audio is higher than a quality score of the first audio.

9. The system of claim 8, wherein the processor is configured to periodically resample the first audio using the microphone of the first client device and the second audio using the microphone of the second client device to update the quality score of the first audio and the quality score of the second audio.

10. The system of claim 8, wherein the processor is configured to output the second audio during the conference in connection with a user interface tile within which video data associated with a user of the first client device is rendered.

11. The system of claim 8, wherein the processor is configured to mute the microphone of the first client device when capturing the second audio using the microphone of the second client device.

12. The system of claim 8, wherein the processor is configured to trigger the sampling of the second audio using the microphone of the second client device based on the keyword detection.

13. The system of claim 8, wherein the processor is configured to:
transmit a request for permission to access the microphone of the second client device.

14. The system of claim 8, wherein the processor is configured to:
determine that an internet protocol (IP) address of the second client device and an IP address of the first client device share a subnet mask; and
transmit a request for permission to access the microphone of the second client device.

15. A non-transitory computer-readable medium storing instructions operable to cause one or more processors to perform operations comprising:
capturing first audio using a microphone of a first client device connected to a conference;
performing keyword detection to determine a keyword that indicates that the first audio is of low quality;
sampling second audio using a microphone of a second client device;
determining that the second client device shares a conference participant account with the first client device; and
responsive to the determination that the second client device shares the conference participant account with the first client device, configuring the microphone of the second client device to capture the second audio for output to the conference when a quality score of the second audio is higher than a quality score of the first audio.

16. The non-transitory computer-readable medium of claim 15, wherein the instructions cause the one or more processors to perform operations comprising:
periodically resampling the first audio using the microphone of the first client device and the second audio using the microphone of the second client device to update the quality score of the first audio and the quality score of the second audio.

17. The non-transitory computer-readable medium of claim 15, wherein the instructions cause the one or more processors to perform the operations comprising:
outputting the second audio during the conference in connection with a user interface tile within which video data associated with a user of the first client device is rendered.

18. The non-transitory computer-readable medium of claim 15, wherein the sampling of the second audio using the microphone of the second client device is triggered based on the keyword detection.

19. The non-transitory computer-readable medium of claim 15, wherein the instructions cause the one or more processors to perform operations comprising:
transmitting a request for permission to access the microphone of the second client device.

20. The non-transitory computer-readable medium of claim 15, wherein the instructions cause the one or more processors to perform operations comprising:
determining that an internet protocol (IP) address of the second client device and an IP address of the first client device share a subnet mask; and
transmitting a request for permission to access the microphone of the second client device.

* * * * *